United States Patent
Goldschmidt et al.

(10) Patent No.: US 9,211,981 B2
(45) Date of Patent: Dec. 15, 2015

(54) CONTAINER CLOSURE SYSTEM

(75) Inventors: Jose Roberto Goldschmidt, Campinas (BR); Flavio Chapela, Sao Paulo (BR); Djalma Oliveira, Braganca Paulista (BR)

(73) Assignee: TYCO ELECTRONICS BRASIL LTDA, Sao Paulo (BR)

(*) Notice: Subject to any disclaimer, the term of this patent is extended or adjusted under 35 U.S.C. 154(b) by 348 days.

(21) Appl. No.: 13/489,622

(22) Filed: Jun. 6, 2012

(65) Prior Publication Data
US 2013/0327784 A1 Dec. 12, 2013

(51) Int. Cl.
| | |
|---|---|
| *B65D 43/24* | (2006.01) |
| *B65D 43/16* | (2006.01) |
| *B65D 43/20* | (2006.01) |
| *B60R 16/023* | (2006.01) |
| *E05D 7/10* | (2006.01) |

(52) U.S. Cl.
CPC ............ *B65D 43/16* (2013.01); *B60R 16/0238* (2013.01); *B65D 43/20* (2013.01); *B65D 43/24* (2013.01); *E05D 7/105* (2013.01); *B65D 2543/00194* (2013.01); *B65D 2543/00296* (2013.01); *B65D 2543/00379* (2013.01); *Y10T 29/4984* (2015.01)

(58) Field of Classification Search
CPC ..................... B65D 2543/00379; B65D 43/16; B65D 43/24
USPC .......................... 220/831, 832, 824; 215/206
See application file for complete search history.

(56) References Cited

U.S. PATENT DOCUMENTS

2006/0191948 A1* 8/2006 Wisniewski et al. .......... 220/831
2010/0276438 A1* 11/2010 Zeiler et al. ................... 220/831

FOREIGN PATENT DOCUMENTS

| EP | 1 338 740 A1 | 8/2003 |
|---|---|---|
| EP | 1 657 116 A1 | 5/2006 |
| FR | 2 913 247 A1 | 9/2008 |

OTHER PUBLICATIONS

European Search Report, Mail Date Aug. 27, 2015, EP 13 17 0679, Application No. 13170679.8—1803/2724957.

* cited by examiner

*Primary Examiner* — Jeffrey Allen

(57) ABSTRACT

A container including a lid having one of a first engagement portion and a second engagement portion for engaging the first engagement portion. A base having the other of the first engagement portion and the second engagement portion. The first engagement portion and second engagement portion are engageable to define different positions between the lid and the base, including selective one-way engagement between a first opened arrangement between the lid and the base and a second opened arrangement between the lid and the base, as well as a closed position between the lid and the base.

17 Claims, 3 Drawing Sheets

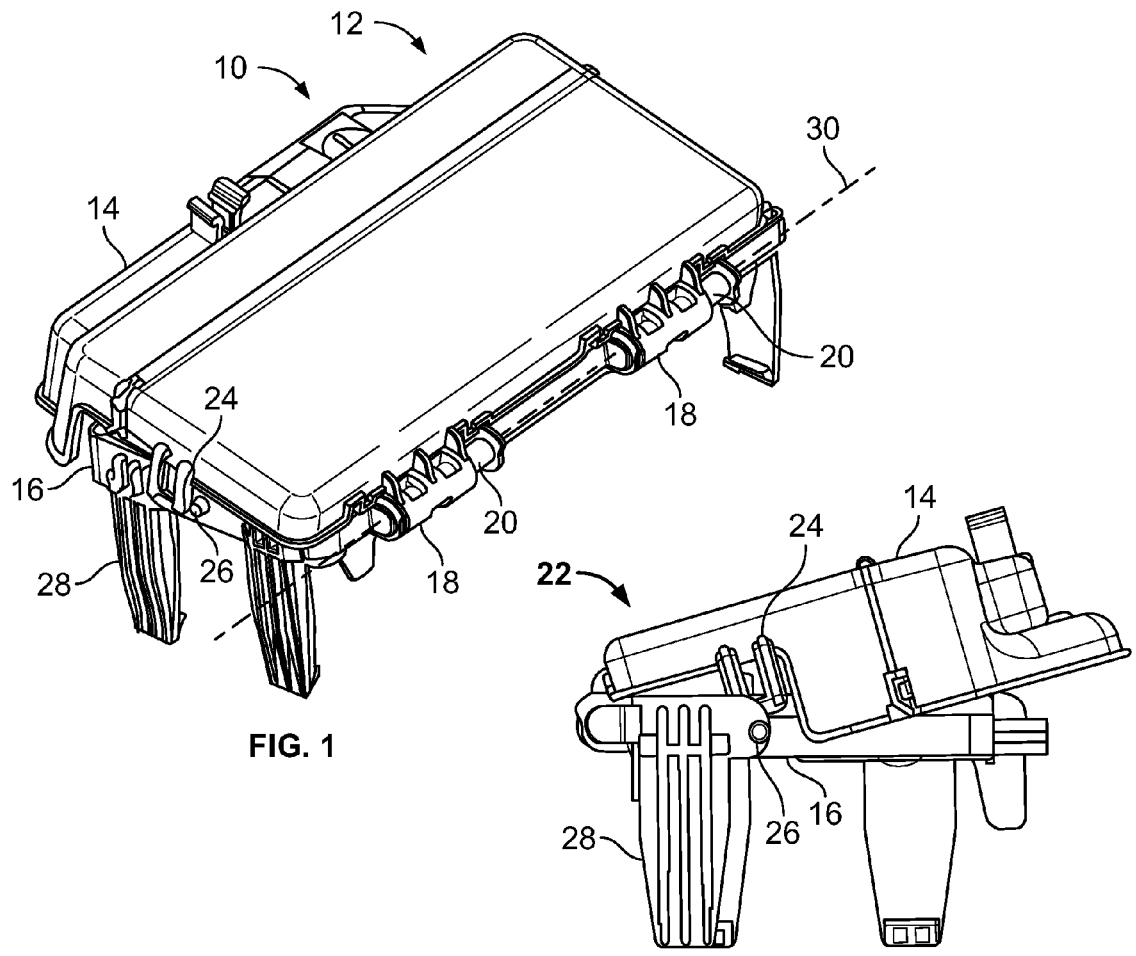
FIG. 1
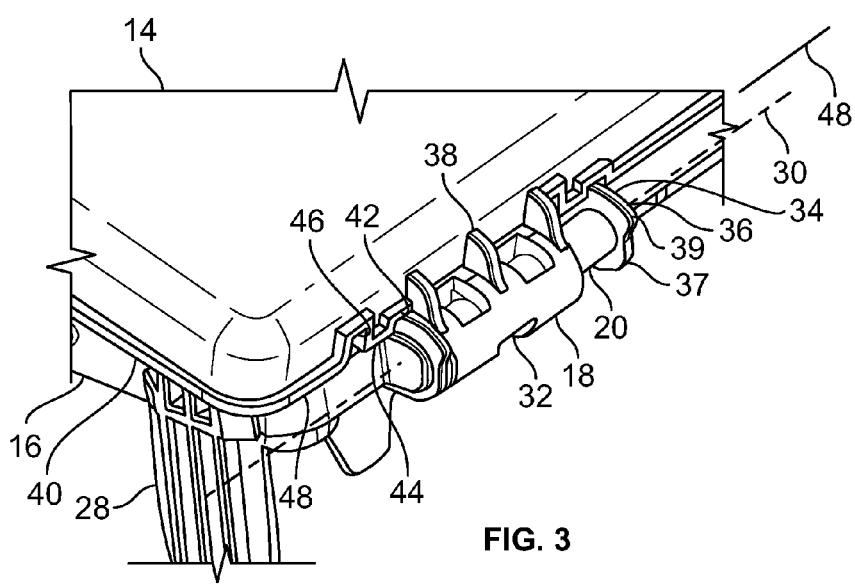
FIG. 2
FIG. 3

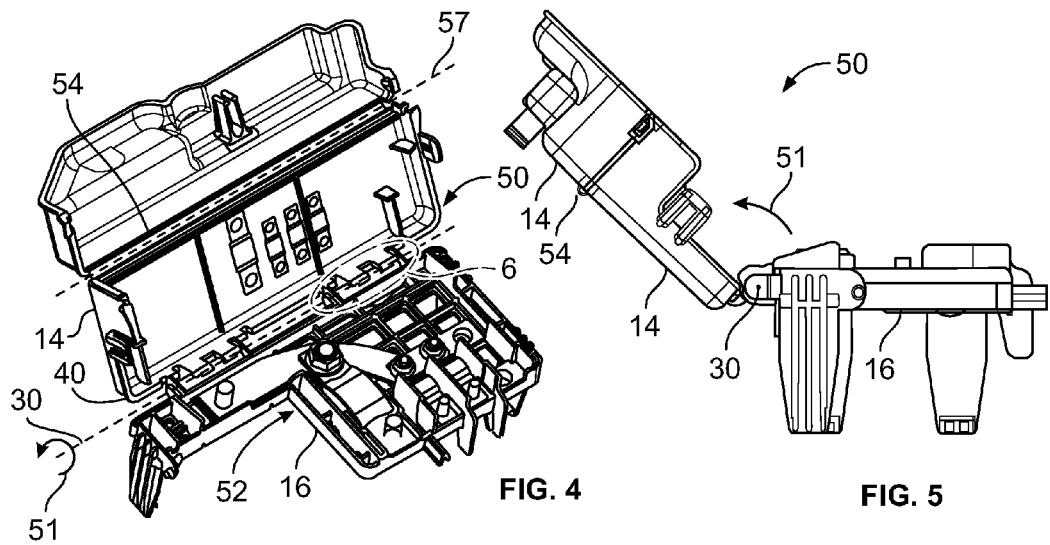
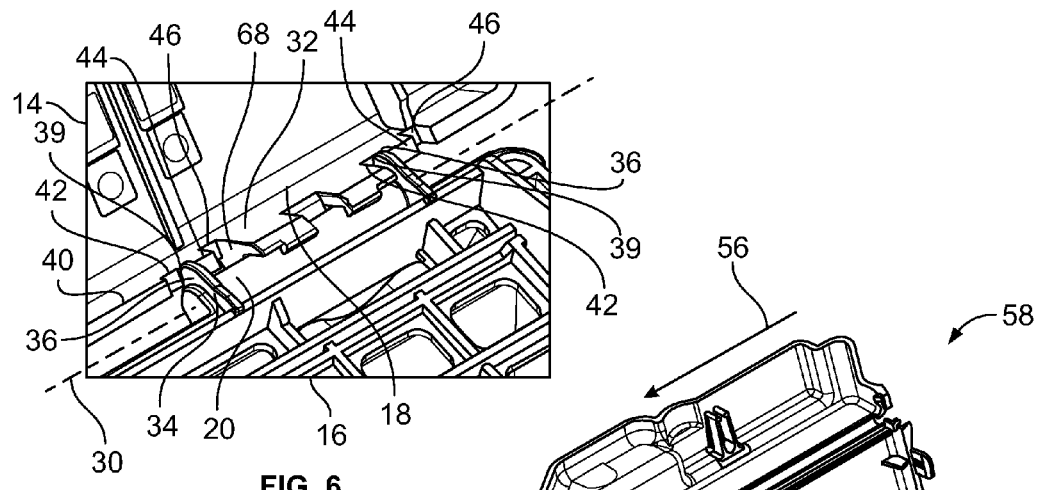
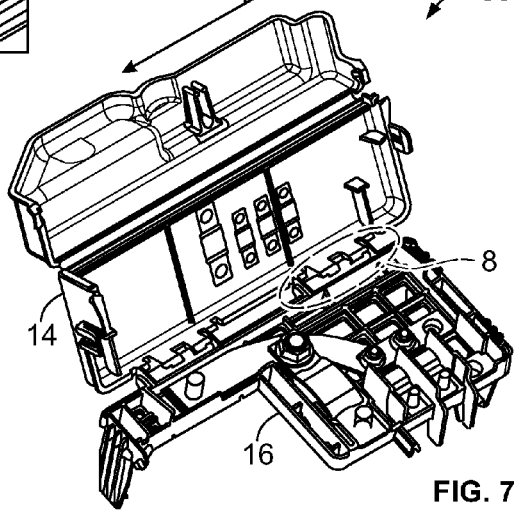

US 9,211,981 B2

CONTAINER CLOSURE SYSTEM

FIELD OF THE INVENTION

The subject matter described and/or illustrated herein relates generally to closable containers, and, more particularly, to a container that is closable in a sequenced manner.

BACKGROUND OF THE INVENTION

Mass production of complex machinery, such as automobiles, present many challenges. For example, closable containers, such as fuse boxes, must be installed, filled with components and/or electrically wired into the automobile and then closed upon completion of the installation of the components prior to the automobile moving to the next assembly stage on the production line. There are continuing challenges associated with containers that are delivered in a closed condition, opening and maintaining the container in an open position to permit installation/manipulation of the required components, followed by the need to easily determine when installation has been completed. A delay associated with any of these circumstances can result in a "bottleneck" or otherwise disrupt production. Current arrangements of such closable containers do not address all of these challenges.

BRIEF DESCRIPTION OF THE INVENTION

In an exemplary embodiment, a container closure system includes a lid having one of a first engagement portion and a second engagement portion for engaging the first engagement portion. A base has the other of the first engagement portion and the second engagement portion. The first engagement portion and second engagement portion are engagable therebetween to define a first position, a second position, a third position and a fourth position. The first position defines a partially closed arrangement between the lid and the base, and the second position defines a first opened arrangement between the lid and the base. The third position defines a second opened arrangement between the lid and the base, and the fourth position defining a fully closed arrangement between the lid and the base. The first engagement portion and the second engagement portion are configured to permit selective engagement between the first position and the second position, permit selective one-way engagement from the second position to the third position, and permit selective engagement between the third position and the fourth position.

In another exemplary embodiment, a closure system for a container includes a lid of a container having one of a first engagement portion and a second engagement portion for engaging the first engagement portion. The first engagement portion and the second engagement portion define a hinge that is engageable along a first axis. A base of a container has the other of the first engagement portion and the second engagement portion The first engagement portion and second engagement portion are engageable therebetween to define a first position, a second position, a third position and a fourth position. The first position defines a partially closed arrangement between the lid and the base, and the second position defines a first opened arrangement between the lid and the base. The third position defines a second opened arrangement between the lid and the base, and the fourth position defines a fully closed arrangement between the lid and the base. The first engagement portion and the second engagement portion are configured to permit selective engagement between the first position and the second position, permit selective one-way engagement from the second position to the third position, and permit selective engagement between the third position and the fourth position.

In another exemplary embodiment, a method for accessing an interior of a includes providing a lid having one of a first engagement portion and a second engagement portion for engaging the first engagement portion. The method further includes providing a base having the other of the first engagement portion and the second engagement portion. The method further includes engaging the first engagement portion with the second engagement portion anywhere between a first position and a second position, the first position defining a partially closed arrangement between the lid and the base, the second position defining a first opened arrangement between the lid and the base. The method further includes actuating the first engagement portion with respect to the second engagement portion from the second position to a third position, the third position defining a second opened arrangement between the lid and the base, the actuation from the second position to be third position defining a one-way engagement sequence. The method further includes selectably actuating the first engagement portion with respect to the second engagement portion between the third position and a fourth position, the fourth position defining a fully closed arrangement between the lid and the base.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 1-2 show different views of an exemplary embodiment of a container in a first position according to the disclosure.

FIG. 3 shows an enlarged partial view of the container of FIG. 1 according to the disclosure.

FIGS. 4-5 show different views of the container of FIG. 1 in a second position according to the disclosure.

FIG. 6 shows an enlarged, partial view taken at region 6 of FIG. 4 according to the disclosure.

FIG. 7 shows an upper perspective view of the container of FIG. 1 in a third position according to the disclosure.

Wherever possible, the same reference numbers will be used throughout the drawings to represent the same parts.

DETAILED DESCRIPTION OF THE INVENTION

Figure 8:
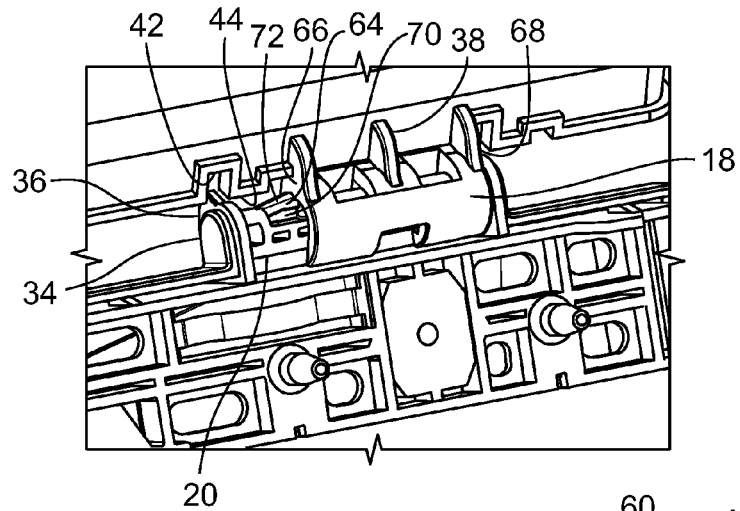
FIG. 8 shows an enlarged, partial reverse view taken at region 8 of FIG. 7 according to the disclosure.

FIGS. 1-3 show an exemplary embodiment of a closure system 10 of a container 12. Container 12 includes a lid 14 having one of a first engagement portion 18 and a second engagement portion 20 for engaging first engagement portion 18. In one embodiment, container 12 is a fuse box for use in an automobile (not shown). As shown in FIG. 1, lid 14 includes first engagement portion 18. Container 12 also includes a base 16 having the other of first engagement portion 18 and the second engagement portion 20, and as shown in FIG. 1, base 16 includes second engagement portion 20, as well as legs 28 usable to position base 16 within the automobile. As further shown in the figures, first engagement portion 18 includes gripping members 32, such as a pair of opposed gripping members 32 (FIG. 10) configured for receiving second engagement portion 20, such as a substantially cylindrical member that is secured to base 16 of the container. In an exemplary embodiment, first engagement portion 18 and second engagement portion 20 define hinge portions that are engageable along an axis, such as first axis 30. As will be discussed in further detail below, engagement portions 18, 20 are engageable to each other to define a first position 22 (FIG. 2), second position 50 (FIG. 5), third position 58 (FIG. 7) and a fourth position 62 (FIG. 9) between lid 14 and base 16 of container 12 in a manner that permits significantly enhanced manufacturability. First position 22 defines a partially closed arrangement between lid 14 and base 16, second position 50 defines a first opened arrangement between lid 14 and base 16, third position 58 defines a second opened arrangement between lid 14 and base 16, and fourth position 62 defines a fully closed arrangement between lid 14 and base 16. First engagement portion 18 and second engagement portion 20 are configured to permit selective engagement between first position 22 and second position 50, permit selective one-way engagement from second position 50 to third position 58, and permit selective engagement between third position 58 and fourth position 62. That is, the arrangement of engagement portions 18, 20 permit container 12 to be opened, secured, accessed and closed in ways that are highly efficient and conducive for installation of the container in a high-volume production or assembly line.

As further shown in FIGS. 1-3, first engagement portion 18 further includes a number of stiffeners 38 (FIG. 3 shows three stiffeners). First engagement portion 18 extends outwardly from stiffeners 38 in opposed directions along a periphery 40 that includes a primary peripheral surface 48. As shown, periphery 40 includes a first notch or first raised portion 42 that is supported by stiffener 38, which first raised portion 42 further extending to a lowered portion 44, and yet further extending to a second notch or second raised portion 46. First raised portion 42, lowered portion 44 and second raised portion 46, as shown in FIG. 3, define a staggered notched arrangement from primary peripheral surface 48 in which first raised portion 42 and second raised portion 46 are spaced away from primary peripheral surface 48, with lowered portion 44 substantially coincident with primary peripheral surface 48. Second engagement portion 20 includes opposed ribs or guides 34 having an increased outwardly extending region 36 terminating at an end 39, and transitioning to a reduced outwardly extending region 37. Stated another way, increased outwardly extending region 36 extends outwardly in a direction perpendicular to first axis 30 a greater distance, or is of greater size in comparison to reduced outwardly extending region 37. When first engagement portion 18 and second engagement portion 20 are brought together into initial engagement with each other, each guide 34 is aligned with a respective first raised portion 42. As a result of this aligned arrangement between respective guides 34 and first raised portions, first engagement portion 18 and second engagement portion 20 may generally rotate with respect to each other about first axis 30.

However, it is to be understood that despite axial alignment between respective guides 34 and first raised portions 42, lid 14 and base 16 of the container are not axially aligned. Such axial misalignment between lid 14 and base 16 is shown in FIGS. 1 and 2 in that latches 24 of lid 14 that are positioned on opposed sides of lid 14, cannot engage corresponding latch pins 26 that extend from opposed sides of base 16. As more clearly shown in FIG. 2, latch 24 is positioned "behind" the portion of base 16, and thus is prevented from engaging base 16.

Furthermore, due to the alignment and meshing of guides 34 of base 16 and respective first raised portions 42 of lid 14 of the container, relative axial movement along first axis 30 of base 16 with respect to lid 14 is prevented. As a result, when the ends of the axially misaligned lid 14 and base 16 of the container opposite the engagement portions 18, 20 are engaged to rotate toward and in close proximity with each other about first axis 30, container 12 defines a first position 22, in which a latch 24 of lid 14 and a latch pin 26 of base 16 cannot engage each other, and container 12 is prevented from achieving a fully closed arrangement, due to the maintained misalignment between the lid and the base 16 of the container 12. That is, first position 22, which defines a partially closed arrangement between axially misaligned lid 14 and base 16, is a typical position in which the containers are received at the production line (to minimize shipping space required to deliver the containers to the production line). The inability of the container to achieve a fully closed arrangement is desirable, in order to save time associated with opening the container by rotation of the lid 14 relative to base 16 about first axis 30 for installation of the container into an automobile on the production line.

As shown in FIGS. 4-6, as a result of rotational movement 51 of lid 14 with respect to base 16 of container 12 about first axis 30, container 12 is urged from first position 22 (FIG. 2) to a second position 50 that defines a first opened arrangement between lid 14 and the base 16. During such rotational movement 51 toward second position 50, guide 34, which includes increased outwardly extending region 36, remains engaged with first raised portion 42 and therefore remains in axial alignment with first raised portion 42. Upon reaching second position 50, electrical cables from the automobile (not shown) may be more easily connected to the container and/or installation/manipulation of electrical components 52 into container 12 may occur. As further shown in FIG. 4, to further enhance access of the container during this process, lid 14 includes a pivoting portion 54 that permits a portion of lid 14 to rotate about an axis 57. As second position 50 is approached, and if desired, it is possible to rotate lid 14 about first axis 30 with respect to base 16 in either direction. Stated another way, it is possible to transition from first position 22 to second position 50 or from second position 50 to first position 22 of container 12.

FIG. 6 shows container 12 in second position 50 (by virtue of rotational movement 51 of lid 14). In second position 50, first raised portion 42 of lid 14 is urged into sufficient rotational movement about first axis 30 to a position in which increased outwardly extending region 36 is no longer surrounded on both sides by the adjacent sides of first raised portion 42. That is, in the second position 50 of container 12, the position of end 39 of increased outwardly extending region 36 of guide 34 of from first axis 30 is no longer captured along first axis 30 by lowered position 44 of periphery 40 of lid 14. Stated another way, lowered portion 44 "clears" guide 34, or guide 34 can no longer prevent directed axial movement 56 along first axis 30. As a result, and as further shown in the figures, end 68 (FIG. 6) of first engagement portion 18 of lid 14, which end 68 forms one side of second raised portion 46, can be directed by axial movement 56 along first axis 30 until end 68 abuts increased outwardly extending region 36 of guide 34.

As shown in FIGS. 7 and 8, upon end 68 abutting increased outwardly extending region 36 of guide 34 by virtue of axial movement 56 along first axis 30, lid 14 is arranged such that the container is in a third position 58. In the manufacturing process, on completion of all required assembly/installation of components in the container, lid 14 may be moved from second position 50 to third position 58, as an indication that all fabrication relating to the container has been completed. As a result of container being arranged in third position 58, also referred to as a second opened arrangement between lid 14 and base 16, an end of a retainer 64, such as a tab 72 extends radially outwardly from a recessed region 70 of second engagement portion 20 and into abutting contact with an end 66 of retainer 64, preventing movement of lid 14 in a direction opposite of previous axial movement 56. That is, retainer 64 permits selective one-way engagement between first engagement portion 18 and second engagement portion 20 from second position 50 and third position 58. In other words, the container is prevented from again achieving or being arranged in second position 50, once the container has achieved or is arranged in third position 58. Similarly, prior to the container reaching second position 50 (i.e., lid 14 is located between first position 22 and second position 50), guide 34 prevents axial movement 56. Stated another way, guide 34 prevents selective engagement from first position 22 directly to third position 58 (i.e., movement of the lid of the container is first required from first position 22 to second position 50, and only upon the lid reaching the second position 50, can the lid then be moved from the second position 50 to the third position 58). In one embodiment, portions of second engagement portion 20, such as retainer 64, or other surfaces of the container not previously exposed prior to the container achieving third position 58, may have a different color than surrounding portions of the container, indicating that third position 58 has been reached. Upon reaching third position 58, such different color arrangement or other indicia (including, but not limited to audio, visual or tactile features) may be an indicator that the work associated with the container has been completed, and signaling the automobile can be moved to a subsequent stage in the assembly line.

Figure 9:
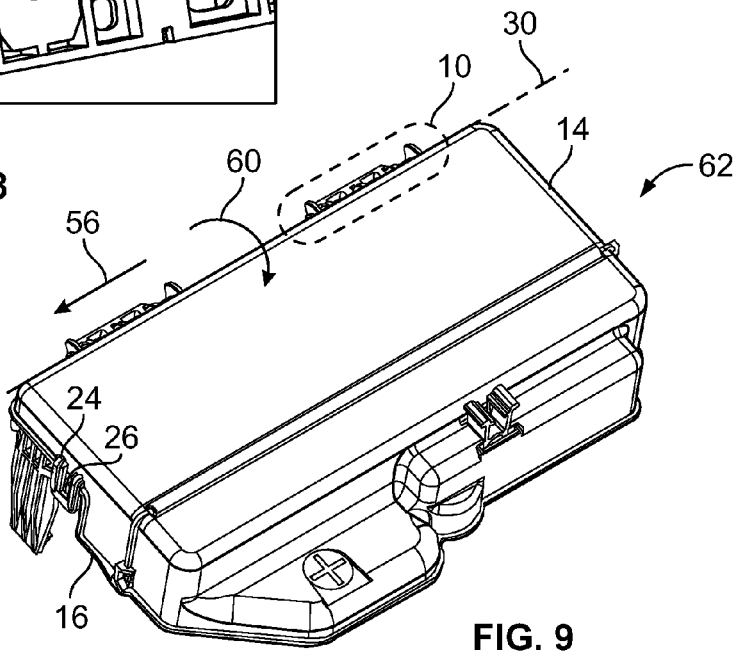
FIG. 9 shows an upper perspective view of the container of FIG. 1 in a fourth position according to the disclosure.
Figure 10:
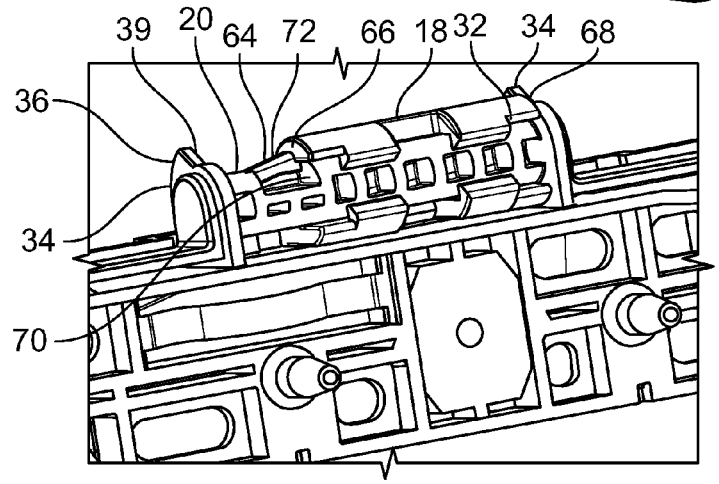
FIG. 10 shows an enlarged, partial view taken at region 10 of FIG. 9 according to the disclosure.

As further shown in FIGS. 9-10, upon the container being arranged in or reaching third position 58, upon sufficient application of a rotational movement 60 of first engagement portion 18 of lid 14 relative to second engagement portion 20 of base 16 about first axis 30, lid 14 is brought to a fully closed arrangement, or fourth position 62. By virtue of relative axial movement 56 between second position 50 and third position 58, fourth position 62 is made possible, as base 16 and lid 14 are brought into axial alignment about first axis 30. In one embodiment lid 14 may be selectably movable between fourth position 62 and third position 58 of the container, as needed.

It is to be understood that the container of the present disclosure may be utilized for other purposes, such as inspection of the container or of a device(s) associated with the container at different stages of a procedure and/or otherwise requiring tactile input, such as to a keypad located interior or exterior of the container, and not requiring assembly/installation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A container closure system comprising:
   a lid having one of a first engagement portion and a second engagement portion for engaging the first engagement portion;
   a base having the other of the first engagement portion and the second engagement portion;
   the first engagement portion and second engagement portion being engageable therebetween to define a first position, a second position, a third position and a fourth position, the first position defining a partially closed arrangement between the lid and the base wherein the lid and the base are prevented from achieving a fully closed arrangement therebetween, the second position defining a first opened arrangement between the lid and the base, the third position defining a second opened arrangement between the lid and the base, and the fourth position defining a fully closed arrangement between the lid and the base;
   wherein the first engagement portion and the second engagement portion are configured to permit selective engagement between the first position and the second position, permit selective one-way engagement between the second position to the third position, and permit selective engagement between the third position and the fourth position.

2. The system of claim 1, wherein the second engagement portion having a retainer to permit selective one-way engagement between the second position to the third position.

3. The system of claim 1, wherein the second engagement portion includes a guide to prevent selective engagement from the first position directly to the third position.

4. The system of claim 1, wherein in the first position, the lid and the base are misaligned to prevent a fully closed arrangement between the lid and the base.

5. The system of claim 1, wherein first engagement portion includes gripping members to engage the second engagement portion, the second engagement portion includes a substantially cylindrical member configured to be received by the first engagement portion.

6. The system of claim 5, wherein second engagement portion includes a retainer.

7. The system of claim 1, wherein indicia is associated with arrangement of the container in the third position.

8. The system of claim 1, wherein in the first position, a first raised portion of the first engagement portion engages a guide of the second engagement portion, with the lid and the base of the container being axially misaligned.

9. The system of claim 8, wherein from the first position of first raised portion of the first engagement portion and a guide of the second engagement portion are rotated relative to one another about an axis toward the second position, the third position achieved by movement of the lid relative to the base in one direction along the axis from the second position, wherein in the third position, movement of the lid relative to the base along the axis in a direction opposite to the one direction is prevented, and the fourth position achieved by rotation of the lid relative to the base about the axis.

10. A closure system for a container comprising:
    a lid of a container having one of a first engagement portion and a second engagement portion for engaging the first engagement portion, the first engagement portion and the second engagement portion defining a hinge that are engageable along a first axis;

a base of a container having the other of the first engagement portion and the second engagement portion;

the first engagement portion and second engagement portion being engagable therebetween to define a first position, a second position, a third position and a fourth position, the first position defining a partially closed arrangement between the lid and the base wherein the lid and the base are prevented from achieving a fully closed arrangement therebetween, the second position defining a first opened arrangement between the lid and the base, the third position defining a second opened arrangement between the lid and the base, and the fourth position defining a fully closed arrangement between the lid and the base;

wherein the first engagement portion and the second engagement portion are configured to permit selective engagement between the first position and the second position, permit selective one-way engagement between the second position to the third position, and permit selective engagement between the third position and the fourth position.

11. The system of claim 10, wherein the second engagement portion has a retainer to permit selective one-way engagement between the second position to the third position.

12. The container of claim 10, wherein the second engagement portion includes a guide member to prevent selective engagement from the first position directly to the third position.

13. The container of claim 10, wherein in the first position, the lid and the base are misaligned to achieve a fully closed arrangement between the lid and the base.

14. The container of claim 10, wherein first engagement portion includes gripping members to engage second engagement portion, the second engagement portion includes a substantially cylindrical portion configured to be received by the first engagement portion.

15. A method for accessing an interior of a container:

providing a lid having one of a first engagement portion and a second engagement portion for engaging the first engagement portion;

providing a base having the other of the first engagement portion and the second engagement portion;

engaging the first engagement portion with the second engagement portion anywhere between a first position and a second position, the first position defining a partially closed arrangement between the lid and the base wherein the lid and the base are prevented from achieving a fully closed arrangement therebetween, the second position defining a first opened arrangement between the lid and the base;

actuating the first engagement portion with respect to the second engagement portion from the second position to a third position, the third position defining a second opened arrangement between the lid and the base, the actuation between the second position to the third position defining a one-way engagement sequence; and selectably actuating the first engagement portion with respect to the second engagement portion between the third position and a fourth position, the fourth position defining a fully closed arrangement between the lid and the base.

16. The method of claim 15, wherein the first engagement portion and the second engagement portion define hinge portions that are engaged along a first axis.

17. The method of claim 16, wherein at least one of the first engagement portion and the second engagement portion includes a guide member to define the one-way engagement sequence between the second position to the third position.

* * * * *